(12) United States Patent
Iwanaga et al.

(10) Patent No.: US 7,847,969 B2
(45) Date of Patent: Dec. 7, 2010

(54) DISPLAY PRINTING SYSTEM AND PROGRAM STORED ON A COMPUTER READABLE MEDIUM

(75) Inventors: Kazuhiko Iwanaga, Nagoya (JP); Motonori Tanaka, Nagoya (JP); Tetsuya Nose, Nagoya (JP); Yasuyuki Fujita, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1376 days.

(21) Appl. No.: 11/034,733

(22) Filed: Jan. 14, 2005

(65) Prior Publication Data
US 2005/0235196 A1 Oct. 20, 2005

(30) Foreign Application Priority Data
Mar. 30, 2004 (JP) .............................. 2004-100564

(51) Int. Cl.
G06K 15/02 (2006.01)
(52) U.S. Cl. .................... 358/1.18; 358/1.12; 358/1.13; 358/1.15; 715/274; 715/700; 715/811
(58) Field of Classification Search .................. 358/1.1, 358/1.13, 1.2, 1.15, 1.18, 1.12; 715/274
See application file for complete search history.

(56) References Cited

U.S. PATENT DOCUMENTS

| | | | |
|---|---|---|---|
| 5,081,595 A * | 1/1992 | Moreno et al. ............. | 358/1.12 |
| 5,609,424 A | 3/1997 | Sakuragi et al. | |
| 6,348,971 B2 * | 2/2002 | Owa et al. ................. | 358/1.15 |
| 6,965,958 B1 * | 11/2005 | Sugiyama ................... | 710/104 |
| 2001/0040684 A1 * | 11/2001 | Takahashi .................. | 358/1.2 |
| 2002/0036788 A1 * | 3/2002 | Hino ......................... | 358/1.11 |
| 2002/0135792 A1 * | 9/2002 | Sommer et al. ............ | 358/1.13 |
| 2002/0156754 A1 * | 10/2002 | Swimm ....................... | 706/20 |
| 2003/0117639 A1 * | 6/2003 | Milton et al. .............. | 358/1.13 |
| 2003/0147097 A1 * | 8/2003 | Kotani et al. .............. | 358/1.18 |
| 2003/0219300 A1 | 11/2003 | Kurashina | |
| 2004/0109008 A1 * | 6/2004 | Sako .......................... | 345/629 |
| 2004/0252340 A1 * | 12/2004 | Komagamine et al. ..... | 358/1.18 |
| 2004/0263870 A1 * | 12/2004 | Itoh et al. ................... | 358/1.1 |

FOREIGN PATENT DOCUMENTS

| EP | 0 885 733 A2 | 12/1998 |
|---|---|---|
| JP | A 8-25710 | 1/1996 |
| WO | WO 03/065200 A1 | 8/2003 |

* cited by examiner

*Primary Examiner*—Twyler L Haskins
*Assistant Examiner*—Kent Yip
(74) *Attorney, Agent, or Firm*—Oliff & Berridge, PLC

(57) ABSTRACT

In template information to be used for selection of a template, a printer model and an individual printer are identified in a PRINTER MODEL column and the kind of printing media loaded in the printer is identified in a KIND OF MEDIA column and a TEMPLATE USED column is provided to correspond to a combination of a printer model and a kind of media. In the TEMPLATE USED column, templates are stored in reverse chronological order of use and the frequency of use of each template is also stored. When a template is used, the history and frequency of use of each template are updated in the TEMPLATE USED column which corresponds to the relevant printer model, individual printer and kind of printing media.

16 Claims, 14 Drawing Sheets

| PRINTER MODEL | KIND OF MEDIA | TEMPLATE USED |
|---|---|---|
| A (1) | ADDRESS LABEL | TEMPLATE 1(2),TEMPLATE 4(5),TEMPLATE 3(1) |
| A (1) | DVD/CD LABEL | TEMPLATE 2(3),TEMPLATE 5(1) |
| A (2) | ADDRESS LABEL | TEMPLATE 3(2) |
| B (1) | B6 – FORM | TEMPLATE 4(1),TEMPLATE 5(2),TEMPLATE 2(4) |
| . . . | . . . | . . . |

FIG.1

| PRINTER MODEL | KIND OF MEDIA | TEMPLATE USED |
|---|---|---|
| A (1) | ADDRESS LABEL | TEMPLATE 1(2),TEMPLATE 4(5),TEMPLATE 3(1) |
| A (1) | DVD/CD LABEL | TEMPLATE 2(3),TEMPLATE 5(1) |
| A (2) | ADDRESS LABEL | TEMPLATE 3(2) |
| B (1) | B6 – FORM | TEMPLATE 4(1),TEMPLATE 5(2),TEMPLATE 2(4) |
| ... | ... | ... |

DISPLAY PRINTING SYSTEM AND PROGRAM STORED ON A COMPUTER READABLE MEDIUM

BACKGROUND OF THE INVENTION

1. Field of the Invention

The present invention relates to a display printing system, and program stored on a computer readable medium for providing a layout style (template) suitable for a medium loaded in a printer.

2. Description of Related Art

Some conventional tape label producing apparatuses easily and quickly produce a desired tape label from tape with an optimum width for an object to which it is affixed, such as a video VHS, 8 mm or Hi8 tape cassette or its case (see Japanese patent application laid-open No. H8-25710 (1996-25710)).

In this type of label producing apparatus, label content data such as text data, barcode data and image data are arranged in one of predetermined layout styles (templates) before editing. In this case, a layout style is chosen regardless of the kind (size) of label (for example, a default layout style (template) or a layout style (template) which was used last), or the layout style used is uniquely determined by the kind (size) of label.

However, when one kind (size) of label may be used for various purposes, the label layout may have to be changed depending on the application purpose. Hence, this conventional system is inconvenient for a user who wishes to use one kind (size) of label for different purposes or in different layout styles (templates). Likewise, when different kinds (sizes) of labels are used, the system is inconvenient because they are likely to be used for different purposes.

SUMMARY OF THE INVENTION

The present invention has been made in view of the above circumstances and has an object to overcome the above problems and to provide a display printing system, and a program stored on a computer readable medium, and a storage medium which enable selection of a layout style (template) depending on the kind of printing medium.

(1) To achieve the above object, there is provided a display printing system comprising printing means in which different kinds of printing media can be loaded; input means for loading data to be printed on the printing media; first memory means for storing a plurality of layout styles suitable for the printing media; second memory means for storing information on the layout styles as template information sorted by kind of the printing media; preview editing means for arranging the data in a layout style selected from the first memory means according to the template information to make up a printed image; display means for showing the printed image; output means for outputting the data together with format information shown through the printed image, to the printing means; and detecting means for detecting the kind of printing media loaded in the printing means, wherein the preview editing means selects the layout style according to the result of detection by the detecting means and the template information.

In the display printing system of the present invention, a layout style is selected according to information on layout styles sorted by kind of printing media and the kind of printing media loaded in the printing means and data is arranged in the selected layout style to make up a printed image. Hence, editing work convenient for the user is automatically done and user-friendliness is improved.

According to another aspect of the invention, there is provided a program stored on a computer readable medium which enables a computer to work as the display printing system as described above (1).

The program stored on a computer readable medium of the present invention enables a computer to work as a display printing system so that a layout style is selected according to information on layout styles sorted by kind of printing media and the kind of printing media loaded in the printing means and data is arranged in the selected layout style to make up a printed image. Hence, editing work convenient for the user is automatically done and user-friendliness is improved.

(2) According to another aspect, the present invention provides a display printing system, comprising printing means in which different kinds of printing media can be loaded; input means for loading data to be printed on the printing media; first memory means for storing a plurality of layout styles suitable for the printing media; second memory means for storing information on the layout styles as template information sorted by kind of the printing media; preview editing means for arranging the data in a layout style selected from the first memory means according to the template information to make up a printed image; display means for showing the printed image; output means for outputting the data together with format information shown through the printed image, to the printing means; and detecting means for detecting the kind of printing media loaded in the printing means; wherein the display printing system further comprises change means for enabling to change to a desired layout style for the preview editing means; and updating means for updating the template information to allocate the desired layout style to the kind of printing media detected by the detecting means.

In the display printing system of the invention where a layout style is selected according to information on layout styles sorted by kind of printing media and the kind of printing media loaded in the printing means and data is arranged in the selected layout style to make up a printed image, the layout style is allocated to the kind of printing media loaded in the printing means and the layout style information is updated. Hence, from then on, editing work convenient for the user is automatically done and user-friendliness is improved.

According to another aspect, the present invention provides a program stored on a computer readable medium which enables a computer to work as the display printing system as described above (2).

The program of the present invention enables a computer to work as a display printing system so that a layout style is selected according to information on layout styles sorted by kind of printing media and the kind of printing media loaded in the printing means and data is arranged in the selected layout style to make up a printed image, the layout style is used for the kind of printing media loaded in the printing means and the layout style information is updated. Hence, from then on, editing work convenient for the user is automatically done and user-friendliness is improved.

(3) According to another aspect, the present invention provides a display printing system comprising printing means in which different kinds of printing media can be loaded; input means for loading data to be printed on the printing media; first memory means for storing a plurality of layout styles suitable for the printing media; second memory means for storing information on the layout styles as template information sorted by kind of the printing media; preview editing means for arranging the data in a layout style selected from the first memory means according to the template information to make up a printed image; display means for showing the printed image; output means for outputting the data together with format information shown through the printed image, to the printing means; and detecting means for detecting the kind of printing media loaded in the printing means, wherein the display printing system further comprises updating means for allocating a layout style used by the preview editing means to the kind of printing media detected by the detecting means and updating the template information.

In the display printing system of the invention where a layout style is selected according to information on layout styles sorted by kind of printing media and the kind of printing media loaded in the printing means and data is arranged in the selected layout style to make up a printed image, the layout style is allocated to the kind of printing media loaded in the printing means and the layout style information is updated. Hence, from then on, editing work convenient for the user is automatically done and user-friendliness is improved.

According to another aspect, the present invention provides a program stored on a computer readable medium which enables a computer to work as the display printing system as described above (3).

The program of the present invention enables a computer to work as a display printing system so that a layout style is selected according to information on layout styles sorted by kind of printing media and the kind of printing media loaded in the printing means and data is arranged in the selected layout style to make up a printed image, the layout style is used for the kind of printing media loaded in the printing means and the layout style information is updated. Hence, from then on, editing work convenient for the user is automatically done and user-friendliness is improved.

(4) According to another aspect, the present invention provides a display printing system comprising printing means in which different kinds of printing media can be loaded; input means for loading data to be printed on the printing media; first memory means for storing a plurality of layout styles suitable for the printing media; second memory means for storing information on the layout styles as template information listed in reverse chronological order of use for each kind of the printing media; preview editing means for arranging the data in a layout style selected from the first memory means according to the template information to make up a printed image; display means for showing the printed image; output means for outputting the data together with format information shown through the printed image, to the printing means; and detecting means for detecting the kind of printing media loaded in the printing means, wherein the display printing system further comprises opportunity providing means for giving the preview editing means an opportunity to change the layout; and the preview editing means changes the layout styles in reverse chronological order of use according to the result of detection by the detecting means and the template information every time the opportunity is given.

In the display printing system of the invention, a layout style is selected according to information on layout styles listed in reverse chronological order of use for each kind of printing media and the kind of printing media loaded in the printing means and data is arranged in the selected layout style to make up a printed image. At this time, every time the opportunity is given, a layout style is reselected in reverse chronological order of use and data is arranged in the reselected layout style to make up a printed image. Hence, editing work convenient for the user is automatically done and user-friendliness is improved.

According to another aspect, the present invention provides a program stored on a computer readable medium enables a computer to work as the display printing system as described above (4).

The program of the invention enables a computer to work as a display printing system so that a layout style is selected according to information on layout styles listed in reverse chronological order of use for each kind of printing media and the kind of printing media loaded in the printing means, and data is arranged in the selected layout style to make up a printed image. At this time, every time the opportunity is given, a layout style is reselected in reverse chronological order of use and data is arranged in the reselected layout style to make up a printed image. Hence, editing work convenient for the user is automatically done and user-friendliness is improved.

(5) According to another aspect, the present invention provides a display printing system comprising printing means in which different kinds of printing media can be loaded; input means for loading data to be printed on the printing media; first memory means for storing a plurality of layout styles suitable for the printing media; second memory means for storing information on the layout styles as template information listed in reverse chronological order of use for each kind of the printing media; preview editing means for arranging the data in a layout style selected from the first memory means according to the template information to make up a printed image; display means for showing the printed image; output means for outputting the data together with format information shown through the printed image, to the printing means; and detecting means for detecting the kind of printing media loaded in the printing means, wherein the display printing system further comprises opportunity providing means for giving the preview editing means an opportunity to change the layout; listing display means for showing, on the display unit, a list of layout styles allocated to the kind of printing media loaded in the printing means according to the result of detection by the detecting means and the template information; and selecting means for selecting a desired layout style from the list of layout styles, and the preview editing means changes the layout style according to the result of selection by the selecting means.

In the display printing system of the invention where a layout style is selected according to information on layout styles listed in reverse chronological order of use for each kind of printing media and the kind of printing media loaded in the printing means and data is arranged in the selected layout style to make up a printed image. At this time, a list of layout styles used for the kind of printing media loaded in the printing means is displayed and data is arranged in a layout style selected from the list to make up a printed image. Hence, editing work convenient for the user is automatically done and user-friendliness is improved.

According to another aspect, the present invention provides a program stored on a computer readable medium which enables a computer to work as the display printing system as described above (5).

The program enables a computer to work as a display printing system so that a layout style is selected according to information on layout styles listed in reverse chronological order of use for each kind of printing media and the kind of printing media loaded in the printing means, and data is arranged in the selected layout style to make up a printed image. At this time, a list of layout styles used for the kind of printing media loaded in the printing means is displayed and data is arranged in a layout style selected from the list to make up a printed image. Hence, editing work convenient for the user is automatically done and user-friendliness is improved.

(6) According to another aspect, the present invention provides a display printing system comprising printing means in which different kinds of printing media can be loaded; input means for loading data to be printed on the printing media; first memory means for storing a plurality of layout styles suitable for the printing media; second memory means for storing information on the layout styles as template information sorted by kind of the printing media along with information on frequency of use; preview editing means for arranging the data in a layout style selected from the first memory means according to the template information to make up a printed image; display means for showing the printed image; output means for outputting the data together with format information shown through the printed image, to the printing means; and detecting means for detecting the kind of printing media loaded in the printing means, wherein the preview editing means selects the layout style with priority on the highest frequency of use according to the result of detection by the detecting means and the template information.

In the display printing system of the invention where a layout style with priority on the highest frequency of use is selected according to information on layout styles listed according to the frequency of use for each kind of printing media and the kind of printing media loaded in the printing means and data is arranged in the selected layout style to make up a printed image. Hence, editing work convenient for the user is automatically done and user-friendliness is improved.

According to another aspect, the present invention provides a program stored on a computer readable medium which enables a computer to work as the display printing system as described above (6).

The program enables a computer to work as a display printing system so that a layout style is selected according to information on layout styles listed according to the frequency of use for each kind of printing media and the kind of printing media loaded in the printing means, and data is arranged in the selected layout style to make up a printed image. Hence, editing work convenient for the user is automatically done and user-friendliness is improved.

(7) According to another aspect, the present invention provides a display printing system comprising plurality of printing means in which different kinds of printing media can be loaded; input means for loading data to be printed on the printing media; first memory means for storing a plurality of layout styles suitable for the printing media; second memory means for storing information on the layout styles as template information sorted by kind of the printing media and by the individual printing means; preview editing means for arranging the data in a layout style selected from the first memory means according to the template information to make up a printed image; display means for showing the printed image; output means for outputting the data together with format information shown through the printed image, to the printing means; detecting means for detecting the kind of printing media loaded in the printing means; and identifying means for identifying a printing means loaded with the printing media detected by the detecting means, wherein the preview editing means selects the layout style according to the result of detection by the detecting means and the template information.

In the display printing system of the invention where a layout style is selected according to information on layout styles sorted by kind of printing media and by individual printing means and the kind of printing media loaded in the printing means, when a plurality of printing means are available, a layout style is selected after identification of an individual printing means, and data is arranged in the selected layout style to make up a printed image. Hence, editing work convenient for the user is automatically done and user-friendliness is improved.

According to another aspect, the present invention provides a program stored on a computer readable medium which enables a computer to work as the display printing system as described above (7).

The program of the invention enables a computer to work as a display printing system so that a layout style is selected according to information on layout styles sorted by kind of printing media and by individual printing means and the kind of printing media loaded in the printing means. Here, when a plurality of printing means are available, a layout style is selected after identification of an individual printing means, and data is arranged in the selected layout style to make up a printed image. Hence, editing work convenient for the user is automatically done and user-friendliness is improved.

(8) According to another aspect, the present invention provides a display printing system comprising printing means in which different kinds of printing media can be loaded; input means for loading data to be printed on the printing media; first memory means for storing a plurality of layout styles suitable for the printing media; second memory means for storing information on the layout styles as template information sorted by kind of the printing media; preview editing means for arranging the data in a layout style selected from the first memory means according to the template information to make up a printed image; display means for showing the printed image; output means for outputting the data together with format information shown through the printed image, to the printing means; and detecting means for detecting the kind of printing media loaded in the printing means, wherein the display printing system further comprises warning means for giving a warning when the kind of printing media for which the preview editing means has selected the layout style is different from the kind of printing media detected by the detecting means.

In the display printing system of the invention where a layout style is selected according to information on layout styles sorted by kind of printing media and the kind of printing media loaded in the printing means and data is arranged in the selected layout style to make up a printed image, when a different kind of printing media is loaded in the printing means, a warning is given. Hence, editing work convenient for the user is automatically done and user-friendliness is improved.

According to another aspect, the present invention provides a program stored on a computer readable medium which enables a computer to work as the display printing system as described above (8).

The program of the invention enables a computer to work as a display printing system so that a layout style is selected according to information on layout styles sorted by kind of printing media and the kind of printing media loaded in the printing means, and data is arranged in the selected layout style to make up a printed image. Here, when a different kind of printing media is loaded in the printing means, a warning is given, so editing work convenient for the user is automatically done and user-friendliness is improved.

(9) According to another aspect, the present invention provides a display printing system comprising plurality of printing means in which different kinds of printing media can be loaded; input means for loading data to be printed on the printing media; first memory means for storing a plurality of layout styles suitable for the printing media; second memory means for storing information on the layout styles as template information sorted by kind of the printing media; preview editing means for arranging the data in a layout style selected from the first memory means according to the template information to make up a printed image; display means for showing the printed image; output means for outputting the data together with format information shown through the printed image, to the printing means; and search means for searching for a printing means loaded with the kind of printing media for which the preview editing means has selected the layout style, wherein the output means outputs the data together with format information shown through the printed image to the printing means identified by the search means.

In the display printing system of the invention where a layout style is selected according to information on layout styles sorted by kind of printing media and the kind of printing media loaded in the printing means and data is arranged in the selected layout style to make up a printed image, when a plurality of printing means are available, data as well as format information shown through a printed image are sent to a printing means loaded with the kind of printing media for which a layout style has been selected. Hence, editing work convenient for the user is automatically done and user-friendliness is improved.

According to another aspect, the present invention provides a program stored on a computer readable medium which enables a computer to work as the display printing system as described above (9).

The program of the invention enables a computer to work as a display printing system so that a layout style is selected according to information on layout styles sorted by kind of printing media and the kind of printing media loaded in the printing means and data is arranged in the selected layout style to make up a printed image. Here, when a plurality of printing means are available, data as well as format information shown through a printed image are sent to the printing means loaded with the kind of printing media for which a layout style has been selected. Hence, editing work convenient for the user is automatically done and user-friendliness is improved.

BRIEF DESCRIPTION OF THE DRAWINGS

The accompanying drawings, which are incorporated in and constitute a part of this specification illustrate an embodiment of the invention and, together with the description, serve to explain the objects, advantages and principles of the invention.

In the drawings,

FIG. 1 shows an example of information on templates to be used in a display printing system according to an embodiment of the present invention;

DETAILED DESCRIPTION OF THE PREFERRED EMBODIMENTS

A detailed description of a preferred embodiment of the present invention will now be given referring to the accompanying drawings.

Figure 10:
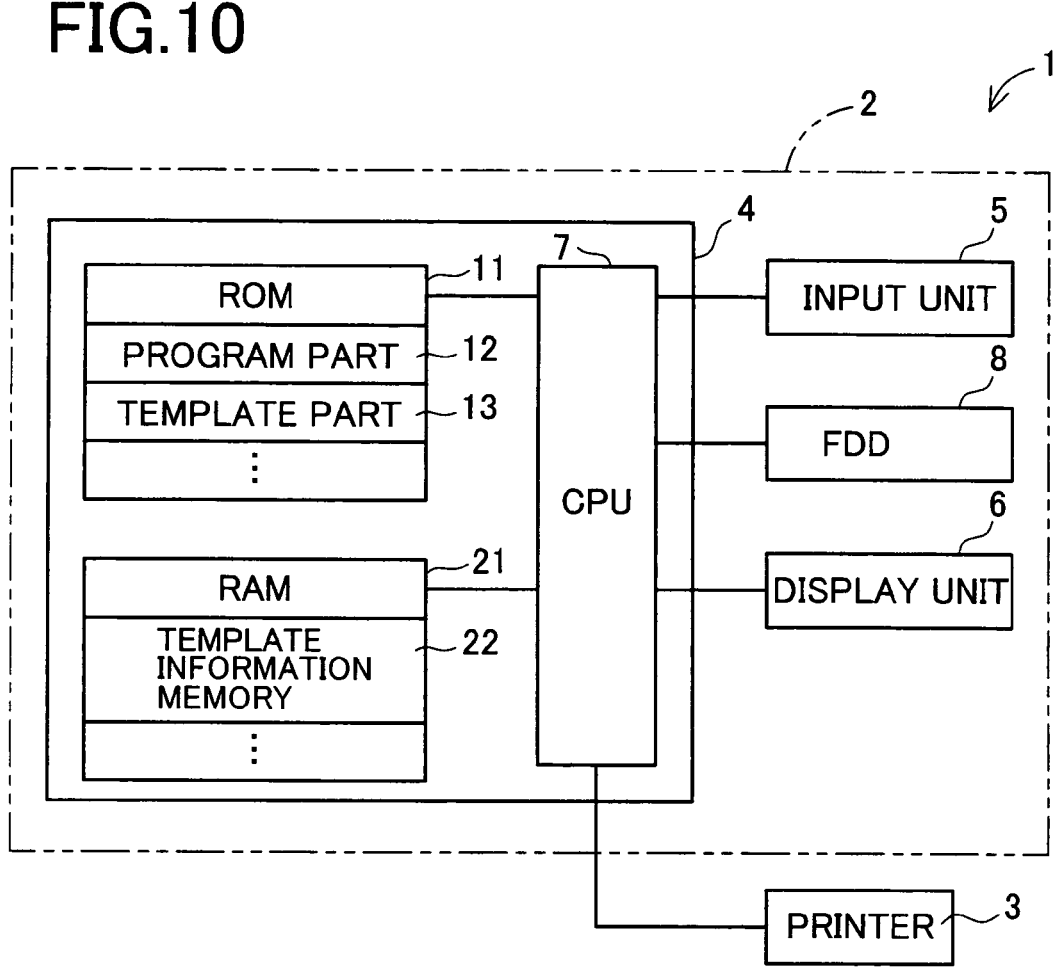
FIG. 10 is a block diagram showing a display printing system according to the embodiment of the present invention.

As shown in a block diagram of FIG. 10, a display printing system 1 mainly includes a personal computer 2 and one or more printers 3. The personal computer 2 is composed of a main body 4, an input unit 5 such as a keyboard or mouse, a display unit 6 such as a liquid crystal display, and an FDD 8 for reading from, and writing to, a flexible disk. The main body 4 includes a CPU 7 which controls various programs (stated later), a ROM 11, and a RAM 21.

Figure 11:
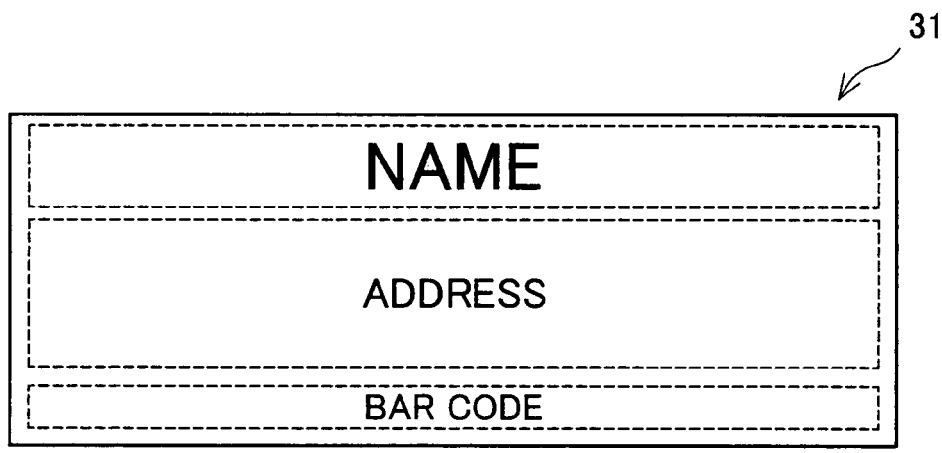
FIG. 11 shows an example of a template to be used in a display printing system according to the embodiment of the present invention.
Figure 12:
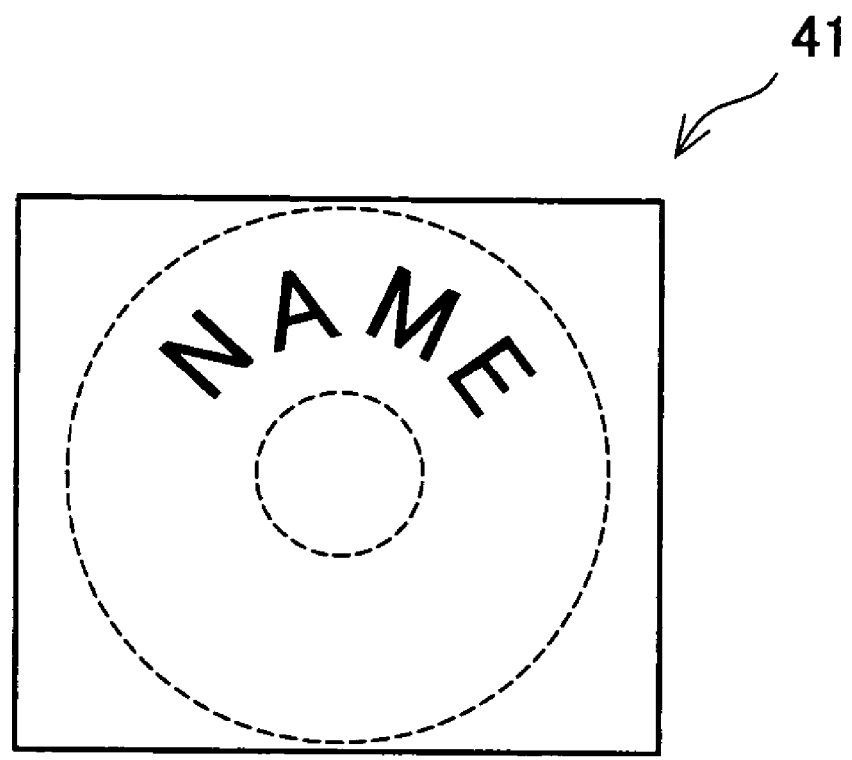
FIG. 12 shows an example of a template to be used in a display printing system according to the embodiment of the present invention.

The ROM 11 includes a program part 12 for storage of various programs (stated later) and a template part 13. The template part 13 stores various templates such as a template 31 (FIG. 11) and a template 41 (FIG. 12). The template 31 shown in FIG. 11 represents a layout style which is used to arrange various types of printing data for creation of address labels. It is a rectangular area which contains a name field, an address field and a barcode field. The template 31 shown in FIG. 12 represents a layout style which is used to arrange various types of printing data for creation of DVD/CD labels. It is a doughnut-shaped area which contains a name field.

The RAM 21 includes a template information memory 22. The template information memory 22 stores, for example, template information 26 as shown in FIG. 1. The template information 26 as shown in FIG. 1 is explained below. As shown in FIG. 1, the template information 26 includes a PRINTER MODEL column 23, a KIND OF MEDIA column 24, and a TEMPLATE USED column 25.

In this respect, the alphabetic characters which identify the model of the printer 3 connected with the personal computer 2 are stored in the PRINTER MODEL column 23. In addition, in preparation for a situation that plural printers 3 of the same model are connected with the personal computer 2, a number in parentheses follows the alphabetic characters to identify an individual printer, in the PRINTER MODEL column 23. Hence, the PRINTER MODEL column 23 shown here suggests that the personal computer 2 is at least connected with two printers 3 of model A and one printer 3 of model B. Here, A(1), A(2) and B(1) serve as identifiers for the three printers.

The KIND OF MEDIA column 24 stores kinds of printing media which can be loaded in individual printers 3 identified in the PRINTER MODEL column 23. In this respect, "ADDRESS LABEL" means the kind of printing media which can be loaded in a printer 3 for creation of address labels. "DVD/CD LABEL" means the kind of printing media which can be loaded in a printer 3 for creation of DVD/CD labels. "B6-FORM" means the kind of printing media which can be loaded in a printer 3 for creation of B6 form labels.

Hence, according to the KIND OF MEDIA column 24 shown here, at least printing media for creation of address labels or printing media for creation of DVD/CD labels can be loaded in the printer 3 identified as "A(1) in the PRINTER MODEL column 23. Similarly, at least printing media for creation of address labels can be loaded in the printer 3 identified as "A(2) in the PRINTER MODEL column 23. Also, at least printing media for creation of B6 form labels can be loaded in the printer 3 identified as "B(1) in the PRINTER MODEL column 23. Therefore, "ADDRESS LABEL", "DVD/CD LABEL", and "B6-FORM" identify the type of printing media which can be loaded in the printers 3.

The TEMPLATE USED column 25 stores templates which were used in the printer 3 identified in the PRINTER MODEL column 23, loaded with the kinds of printing media identified in the KIND OF MEDIA column 24, for creation of labels. The number which follows the word "TEMPLATE" represents the type of the template concerned. The suffixed number in parentheses denotes the number of times of use of the template concerned. In the TEMPLATE USED column 25, information on the latest template (template used last) is stored in the leftmost position (top of record) and information on other templates used is moved to the right (toward the end of record).

Hence, according to the TEMPLATE USED column 25 shown here, when the kind of printing media for creation of address labels as identified in the KIND OF MEDIA column 24 was loaded in the printer 3 identified as "A(1)" in the PRINTER MODEL column 23, TEMPLATE 3, TEMPLATE 4, and TEMPLATE 1 were so far used in the order of mention; and the template identified as TEMPLATE 3 was used once, the template identified as TEMPLATE 4 five times, and the template identified as TEMPLATE 1 twice.

Also, when printing media for creation of DVD/CD labels as identified in the KIND OF MEDIA column 24 was loaded in the printer 3 identified as "A(1)" in the PRINTER MODEL column 23, TEMPLATE 5 and TEMPLATE 2 were so far used in the order of mention; and the template identified as TEMPLATE 5 was used once, the template identified as TEMPLATE 2 three times.

Similarly, when printing media for creation of address labels as identified in the KIND OF MEDIA column 24 was loaded in the printer 3 identified as "A(2)" in the PRINTER MODEL column 23, only the template identified as TEMPLATE 3 was used twice so far.

Also, when printing media for creation of B6 form labels as identified in the KIND OF MEDIA column 24 was loaded in the printer 3 identified as "B(1)" in the PRINTER MODEL column 23, TEMPLATE 2, TEMPLATE 5, and TEMPLATE 4 were so far used in the order of mention; and the template identified as TEMPLATE 4 was used once, the template identified as TEMPLATE 5 twice, and the template identified as TEMPLATE 2 four times.

The templates identified as TEMPLATE 1, TEMPLATE 2, TEMPLATE 3, TEMPLATE 4, and TEMPLATE 5 in the TEMPLATE USED column 25 are stored in the template part 13 of the ROM 11 as mentioned above.

Figure 2:
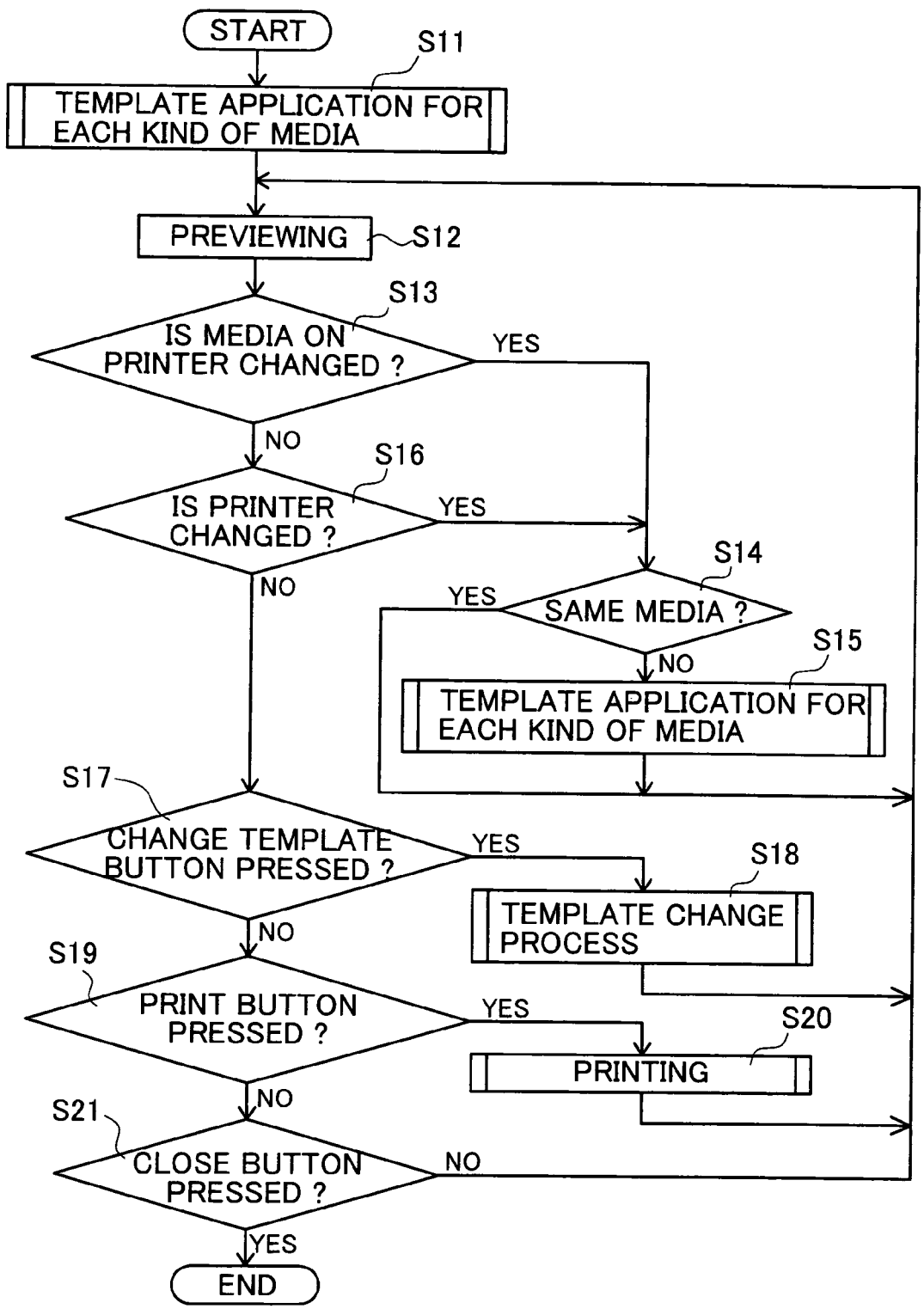
FIG. 2 is a flowchart concerning a main program to be used in a display printing system according to the embodiment of the present invention.

Next, a program which is executed to enable the display printing system 1 in this embodiment to work will be described. FIG. 2 is a flowchart for a main program which enables the display printing system 1 in this embodiment to work. As shown in FIG. 2, for the display printing system 1 to work, first a template is applied for each kind of media at S11 and then a preview screen appears at S12.

Figure 13:
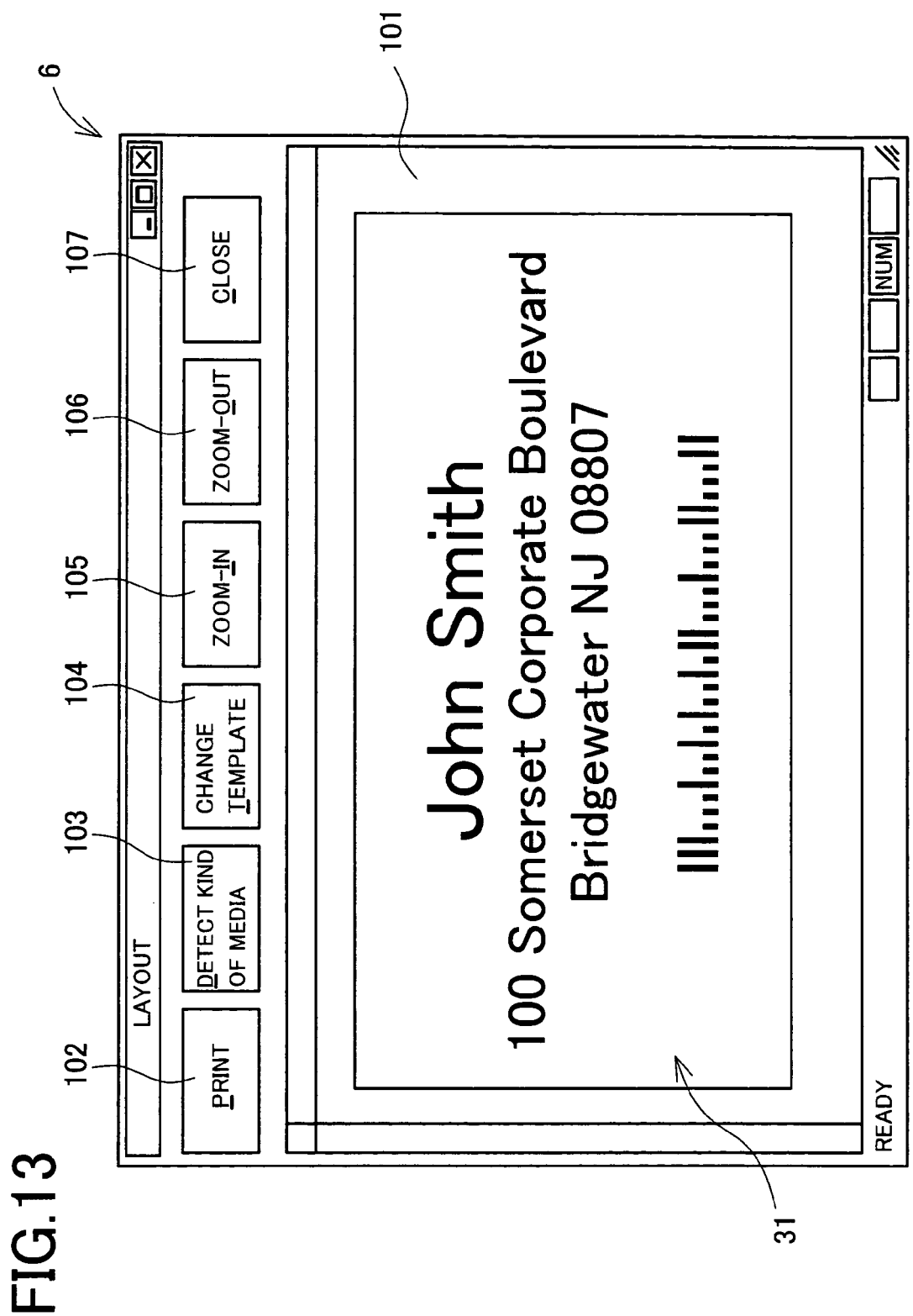
FIG. 13 shows an example of a preview screen in a display printing system according to the embodiment of the present invention.
Figure 14:
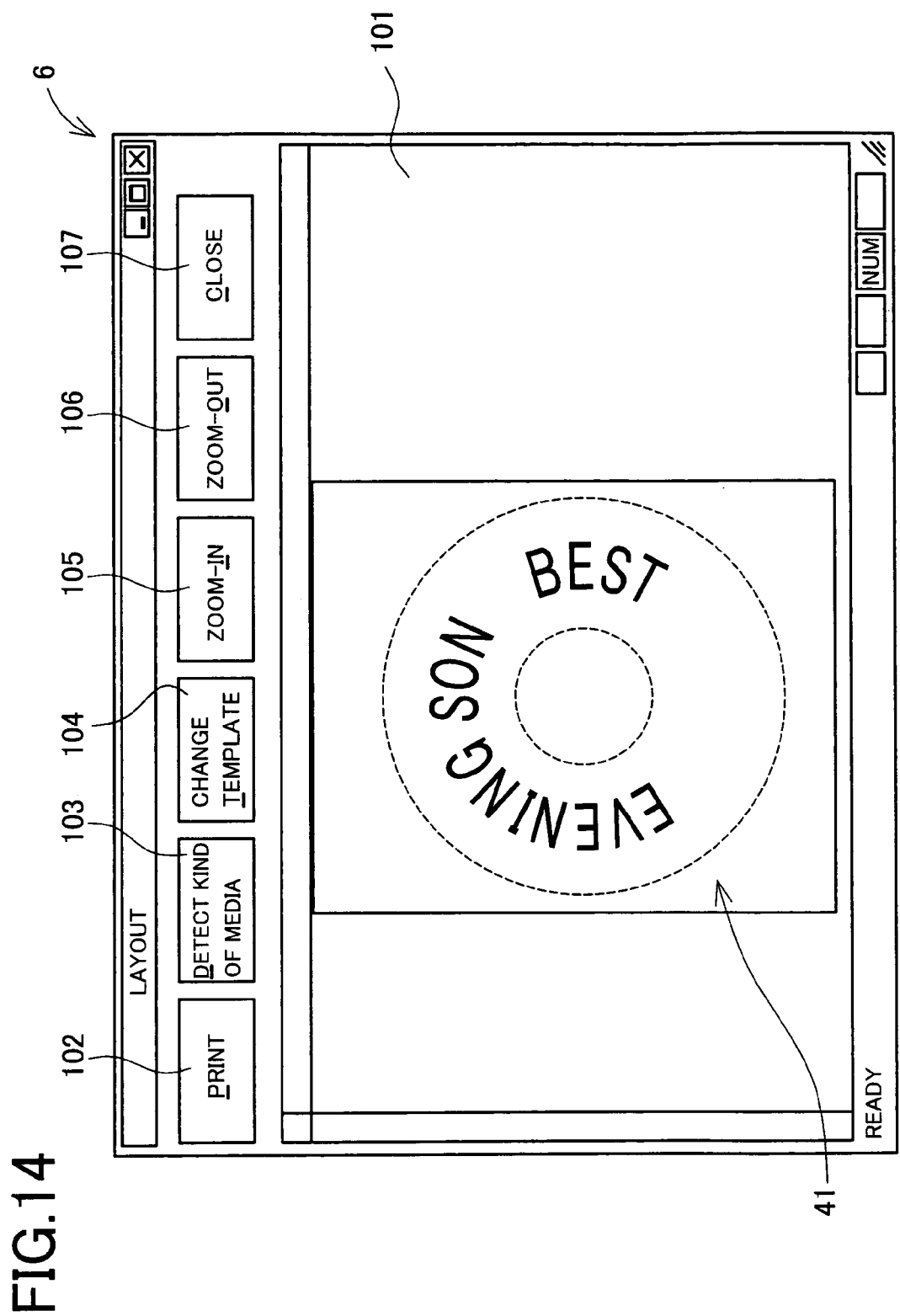
FIG. 14 shows an example of a preview screen in a display printing system according to the embodiment of the present invention.

On a preview screen (S12), for creation of address labels, for example, a printed image as shown in FIG. 13 appears in a window 101 of the display unit 6 where the printed image contains the printing data (name, address, and barcode) written in the fields of the template 31 shown in FIG. 11; or for creation of DVD/CD labels, for example, a printed image as shown in FIG. 14 appears in the window 101 of the display unit 6 where the printed image contains the printing data (name, address, and barcode) written in the fields of the template 41 shown in FIG. 12.

On a preview screen (S12), a PRINT button 102, a DETECT KIND OF MEDEIA button 103, a CHANGE TEMPLATE button 104, a ZOOM-IN button 105, a ZOOM-OUT button 106, and a CLOSE button for closing the window 101 appear in the window 101 of the display unit 6, as shown in FIGS. 13 and 14.

After previewing at S12, a decision is made as to whether the media loaded in the printer 3 is changed or not. This decision is made according to a USB signal, etc. sent from the printer 3 to the main body 2.

Here, "media" means a printing medium loaded in the printer 3 and hereinafter a printing medium loaded in the printer 3 is simply referred to as "media".

When it is decided that the media loaded in the printer 3 has been changed (YES at S13), the system proceeds to S14. When it is decided that the media loaded in the printer 3 has not been changed (NO at S13), the system proceeds to S16 where a decision is made as to whether the printer 3 (printer available for creation of a desired label) has been changed or not. This decision is also made according to a USB signal, etc. sent from the printer 3 to the main body 2.

When it is decided that the printer 3 has been changed (YES at S16), the system proceeds to S14. When it is decided that the printer 3 has not been changed (NO at S16), the system proceeds to S17 where a decision is made as to whether the CHANGE TEMPLATE button 104 has been pressed or not. This decision is made based on the result as to whether the CHANGE TEMPLATE button 104 has been clicked with the mouse as an input unit 5 or not. When it is decided that the CHANGE TEMPLATE button 104 has been pressed (YES at S17), the system proceeds to S18 where a template change process (stated later) is performed, before returning to the step of previewing at S12 as mentioned above. On the other hand, when it is decided that the CHANGE TEMPLATE button 104 has not been pressed (NO at S17), the system proceeds to S19.

At S19, a decision is made as to whether the PRINT button 102 has been pressed or not. This decision is made based on the result as to whether the PRINT button 102 has been clicked with the mouse as an input unit 5 or not. When it is decided that the PRINT button 102 has been pressed (YES at S19), the system proceeds to S20 where a printing process (stated later) is performed, before returning to the step of previewing at S12 as mentioned above. On the other hand, when it is decided that the PRINT button 102 has not been pressed (NO at S19), the system proceeds to S21.

At S21, a decision is made as to whether the CLOSE button has been pressed or not. This decision is made based on the result as to whether the CLOSE button 107 has been clicked with the mouse as an input unit 5 or not. When it is decided that the CLOSE button has been pressed (YES at S21), the main program shown in FIG. 2 is ended. On the other hand, when it is decided that the CLOSE button has not been pressed (NO at S21), nothing is done and the system proceeds to the step of previewing at S12.

In the main program of FIG. 2, when it is decided that the media loaded in the printer 3 has been changed (YES at S13) or that the printer 3 has been changed to another printer available for printing (YES at S16), the system proceeds to S14. At S14, a decision is made as to whether the media currently loaded in the printer 3 is the same media that has been relevant at S12. When it is decided that the media currently loaded in the printer 3 is the same media that has been relevant at S12 (YES at S14), nothing is done and the system returns to S12 for previewing. On the other hand, when it is decided that the media currently loaded in the printer 3 is not the same media that has been relevant at S12 (NO at S14), the system proceeds to S15 where a media application process for each kind of media (stated later) is carried out, before returning to S12 for previewing. The template application process for each kind of media at S15 is the same as that at S11.

Figure 3:
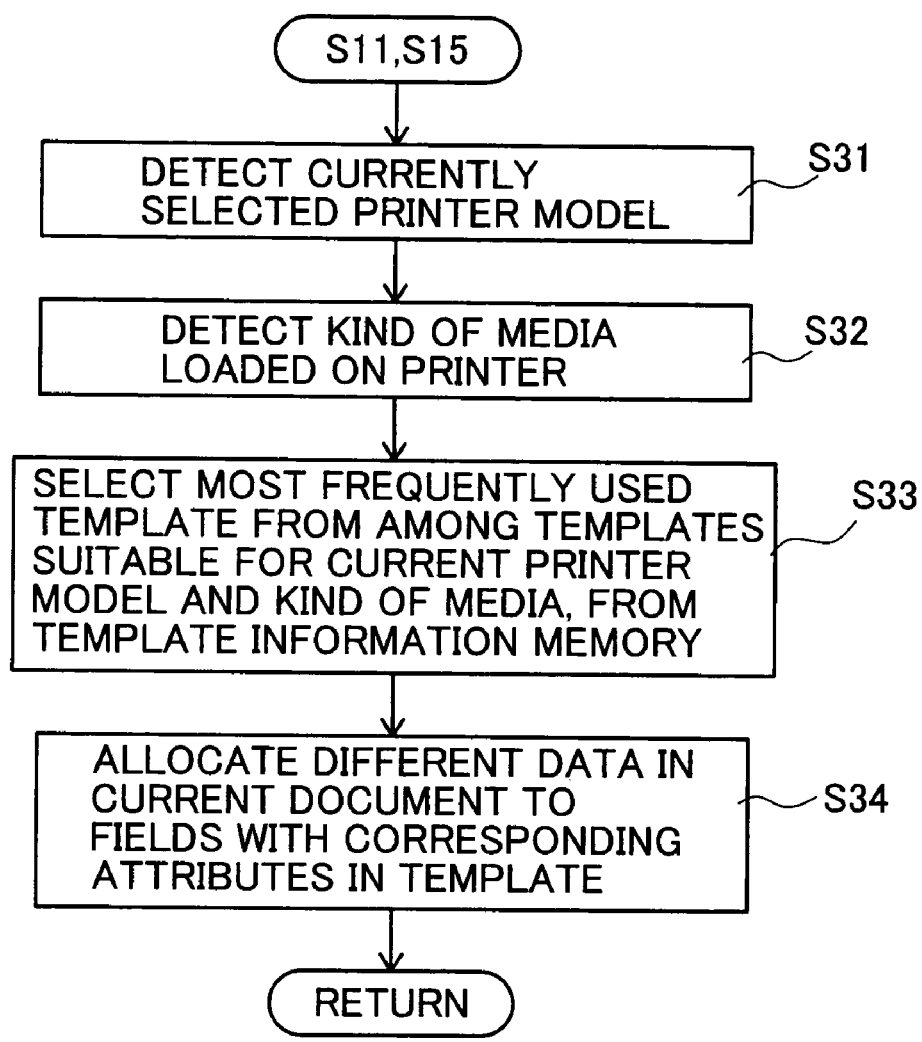
FIG. 3 is a flowchart concerning a template application process for each kind of media under a sub-program to be used in a display printing system according to the embodiment of the present invention.

Next, the template application process for each kind of media (S11, S15) will be explained referring to FIG. 3. FIG. 3 is a flowchart concerning a sub-program for the template application process for each kind of media. As shown in FIG. 3, in the template application process, first at S31, the printer model (and individual printer) currently selected is detected. More specifically, which printer model (and individual printer) is currently selected from among the printers connected with the main body 2 is detected. Then, at S32, the kind of media loaded in the printer 3 is detected. More specifically, the kind of the media loaded in the currently selected printer 3 is detected. These detection steps are performed based on USB signals, etc. sent from the printer 3 to the main body 2.

Then at S33, the most frequently used template is selected from among templates which are suitable for the current printer model and kind of media. More specifically, the template which was most frequently used is selected from the template information 26 which is stored in the template information memory 22 as suitable for the printer model (and individual printer) and the kind of media which have been detected at S31 and S32 respectively.

For example, according to the template information 26 shown in FIG. 1, when "A(1)" is detected for the printer model (and individual printer) and "ADDRESS LABEL" is detected for the kind of media, the most frequently used template, or TEMPLATE 4, is selected. When "A(1)" is detected for the printer model (and individual printer) and "DVD/CD LABEL" is detected for the kind of media, the most frequently used template, or TEMPLATE 2, is selected. When "A(2)" is detected for the printer model (and individual printer) and "ADDRESS LABEL" is detected for the kind of media, the most frequently used template, or TEMPLATE 3, is selected. When "B(1)" is detected for the printer model (and individual printer) and "B6-FORM" is detected for the kind of media, the most frequently used template, or TEMPLATE 2, is selected.

When it is impossible to select the most frequently used template from the template information 26 stored in the template information memory 22 as suitable for the printer model (and individual printer) and the kind of media which have been detected, a default template is selected.

The information on the selected template is read from the template part 13 of the ROM 11 and stored in a reserved work area of the RAM 21 for editing to be done later.

At S34, different types of data in the current document are allocated to fields with corresponding attributes in the template respectively. More specifically, different types of printing data in the current document are allocated to fields with corresponding attributes in the selected template, before returning to S12 (FIG. 2) for previewing.

Concretely, when the selected template is a template 31 as shown in FIG. 11, corresponding printing data are placed in the name, address and barcode fields and as a consequence, an image in printed form appears in the window 101 of the display unit 6 as shown in FIG. 13. When the selected template is a template 41 as shown in FIG. 12, printing data is placed in the name field and as a consequence, an image in printed form appears in the window 101 of the display unit 6 as shown in FIG. 14.

Therefore, according to the flowchart of FIG. 3, a preview in the format of the most frequently used template is automatically made for the media loaded in the currently selected printer 3 among the printers 3 connected with the main body 2.

Figure 8:
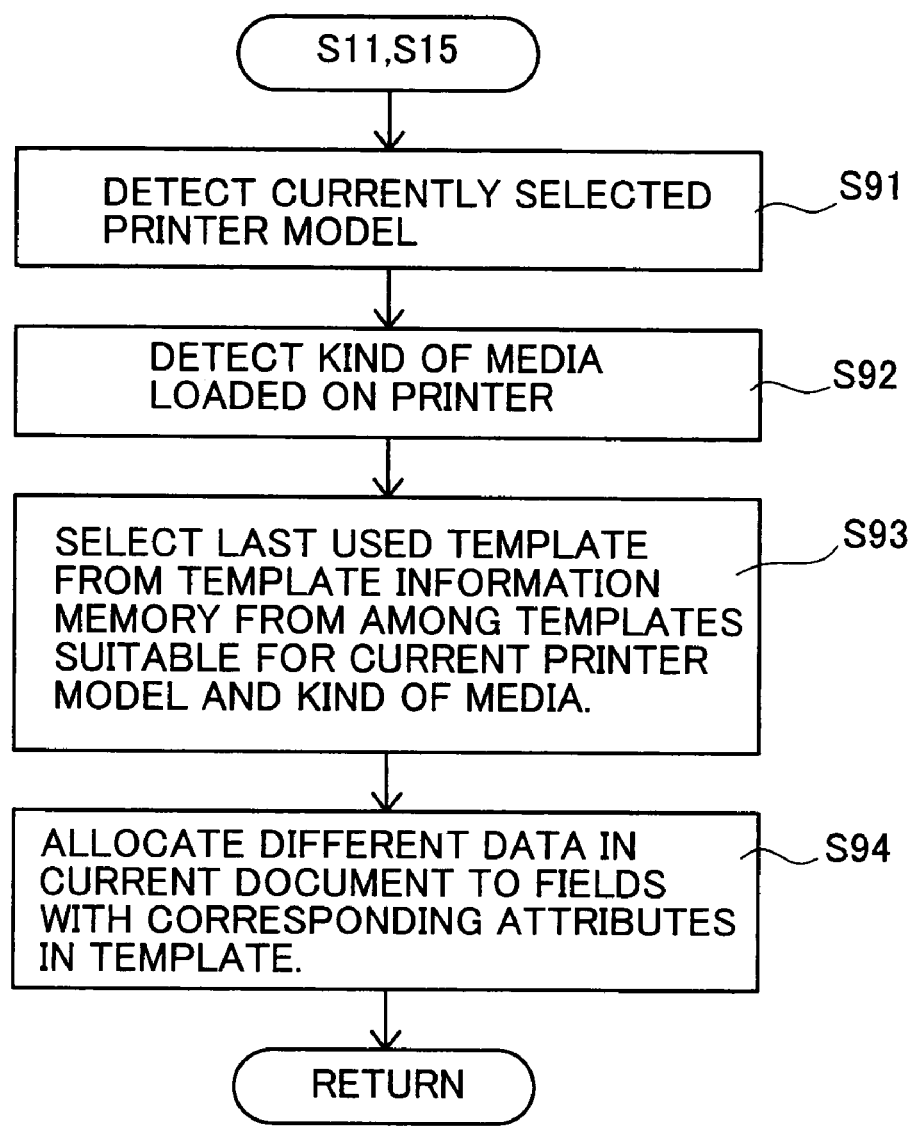
FIG. 8 is a flowchart concerning a template application process for each kind of media under a sub-program to be used in a display printing system according to the embodiment of the present invention.

The template application process for each kind of media can be explained with reference to FIG. 8 instead of FIG. 3. FIG. 8 is a flowchart concerning a sub-program for a template application process for each kind of media. As shown in FIG. 8, in this template application process, first at S91, the printer model currently selected is detected. More specifically, which printer model (and individual printer) is currently selected from among the printers 3 connected with the main body 2 is detected. Then, at S92, the kind of media loaded in the printer 3 is detected. More specifically, the kind of the media loaded in the selected printer 3 is detected. These detection steps are performed according to USB signals, etc. sent from the printer 3 to the main body 2.

Then at S93, the latest (last used) template is selected from among templates which are suitable for the current printer model and kind of media. More specifically, the latest template, or the template which was used last, is selected from the template information 26 which is stored in the template information memory 22 as suitable for the printer model (and individual printer) and the kind of media which have been detected at S91 and S92 respectively.

For example, according to the template information 26 shown in FIG. 1, the latest (last used) template is stored in the leftmost position (top of record) of the TEMPLATE USED column 25. Hence, when "A(1)" is detected for the printer model (and individual printer) and "ADDRESS LABEL" is detected for the kind of media, the latest (last used) template, or TEMPLATE 1, is selected. When "A(1)" is detected for the printer model (and individual printer) and "DVD/CD LABEL" is detected for the kind of media, the latest (last used) template, or TEMPLATE 2, is selected. When "A(2)" is detected for the printer model (and individual printer) and "ADDRESS LABEL" is detected for the kind of media, the latest (last used) template, or TEMPLATE 3, is selected. When "B(1)" is detected for the printer model (and individual printer) and "B6-FORM" is detected for the kind of media, the latest (last used) template, or TEMPLATE 4, is selected.

When it is impossible to select the latest (last used) template from the template information 26 stored in the template information memory 22 as suitable for the printer model (and individual printer) and the kind of media which have been detected, a default template is selected.

The information on the selected template is read from the template part 13 of the ROM 11 and stored in a reserved work area of the RAM 21 for editing to be done later.

At S94, different types of data in the current document are allocated to fields with corresponding attributes in the template respectively. More specifically, different types of printing data in the current document are allocated to fields with corresponding attributes in the selected template, before returning to S12 (FIG. 2) for previewing.

Concretely, when the selected template is a template 31 as shown in FIG. 11, corresponding printing data are placed in the name, address and barcode fields and as a consequence, an image in printed form appears in the window 101 of the display unit 6 as shown in FIG. 13. When the selected template is a template 41 as shown in FIG. 12, printing data is placed in the name field and as a consequence, an image in printed form appears in the window 101 of the display unit 6 as shown in FIG. 14.

Therefore, according to the flowchart of FIG. 8, a preview in the format of the latest (last used) template is automatically made for the media loaded in the currently selected printer 3 among the printers 3 connected with the main body 2.

Figure 4:
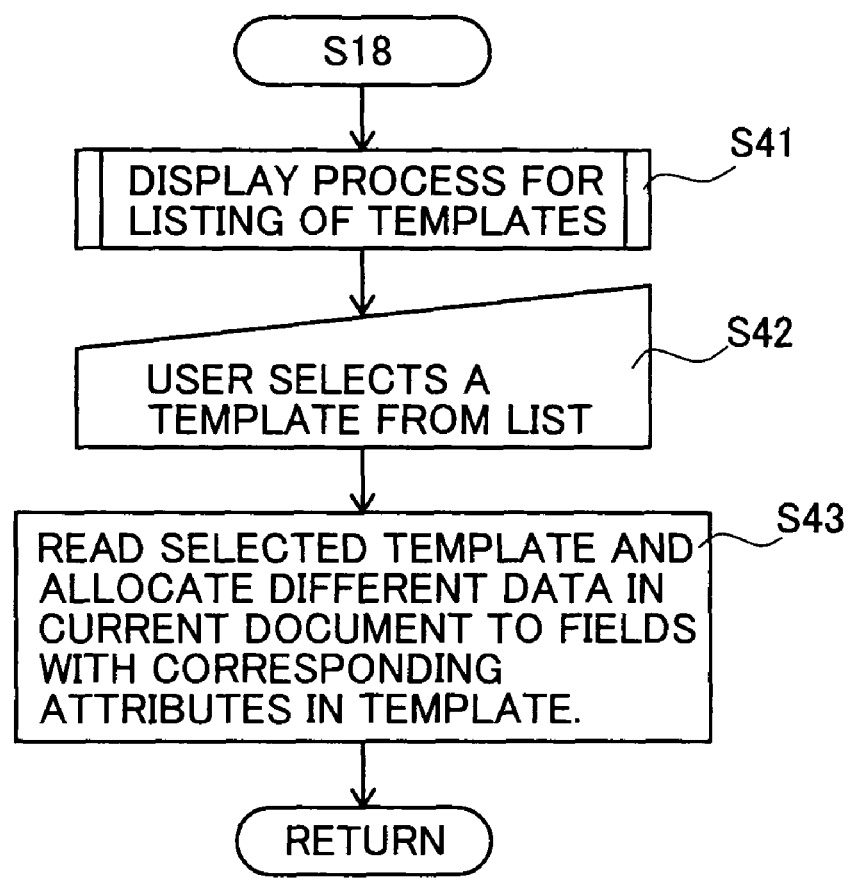
FIG. 4 is a flowchart concerning a template change process under a sub-program to be used in a display printing system according to the embodiment of the present invention.
Figure 5:
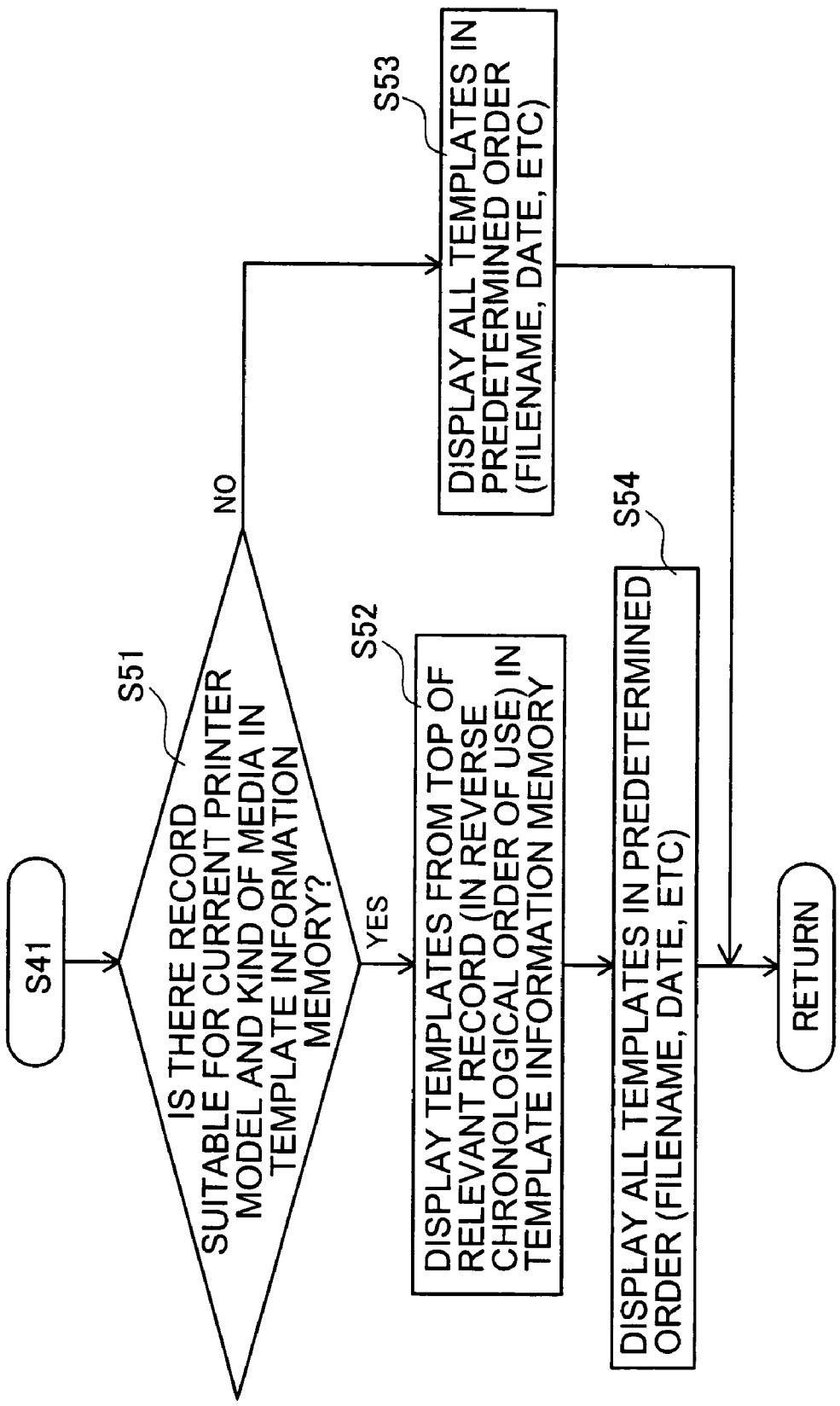
FIG. 5 is a flowchart concerning listing of templates for each kind of media under a sub-program to be used in a display printing system according to the embodiment of the present invention.

Next, the template change process at S18 of FIG. 2 will be explained referring to FIG. 4. FIG. 4 is a flowchart concerning a sub-program for a template change process. As shown in FIG. 4, in the template change process, first a template listing display process as shown in FIG. 5 is carried out at S41.

The template listing display process at S41 will be explained below referring to FIG. 5. FIG. 5 is a flowchart concerning a sub-program for the template listing display process. As shown in FIG. 5, in the template listing display process, first at S51, a decision is made as to whether or not the template information memory 22 contains a record suitable for the current printer model and kind of media. More specifically, whether or not there is a record suitable for the media loaded in the currently selected printer 3 in the TEMPLATE USED column 25 of the template information 26 is decided.

When it is decided that there is a record suitable for the media loaded in the currently selected printer 3 in the TEMPLATE USED column 25 of the template information 26 (YES at S51), the system proceeds to S52. At S52, templates in the relevant record of the template information memory 22 are shown from the top of the record in reverse chronological order of use (the last used template is read first). More specifically, all templates identified in the TEMPLATE USED column 25 are read from the template part 13 of the ROM 11 and listed on the display unit 6 from the leftmost template (top of record) in the TEMPLATE USED column 25, or in reverse chronological order of use (the last used template is read first), then the system proceeds to S54.

Figure 15:
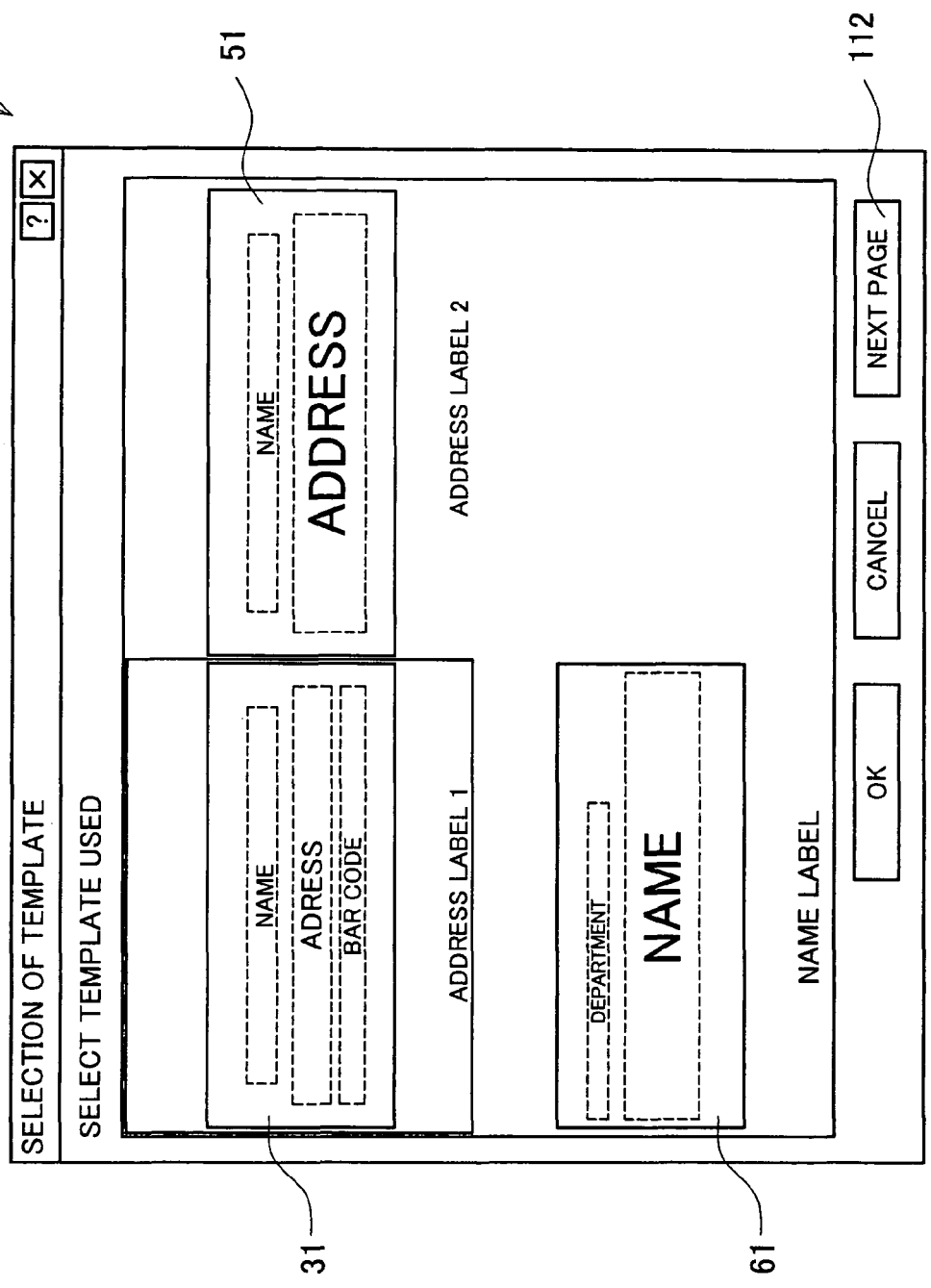
FIG. 15 shows an example of a template selection screen in a display printing system according to the embodiment of the present invention.

FIG. 15 shows a concrete example of such a list in the window 111 of the display unit 6. In this case, for the media loaded in the currently selected printer 3, TEMPLATE 31, TEMPLATE 51, and TEMPLATE 61 are listed in the order of mention in the TEMPLATE USED column 25 of the template information 26.

On the other hand, when it is decided that there is no record suitable for the media loaded in the currently selected printer 3 in the TEMPLATE USED column 25 of the template information 26 (NO at S51), the system proceeds to S53. At S53, all templates are shown in a predetermined order (filename, date, etc). More specifically, all templates are read from the template part 13 of the ROM 11 and stored in a reserved work area of the RAM 21; then they are listed on the display unit 6 according to a default condition (for example, in the order of filename or date), before the system proceeds to S42 of FIG. 4.

After all templates identified in the TEMPLATE USED column 25 are listed on the display unit 6 at S52, at S54 the list is followed by a list of all templates read from the template part 13 of the ROM 11 and listed on the display unit 6 according to the above default condition as at S52, before the system proceeds to S42 of FIG. 4.

Therefore, since previously used templates suitable for the media loaded in the printer 3 are listed at S52 and further all templates are listed at S54, it is possible to select a template from not only the list of previously used templates suitable for the media loaded in the printer 3 but also from unused templates which are suitable for the media loaded in the printer 3.

Because a field for showing templates other than the list of previously used templates is not available in the window 111 as shown in FIG. 15, all templates cannot be listed at a glance after the list. For this reason, a NEXT PAGE button 112 is provided in the window 111 so that by clicking it with a mouse button 112, the screen is changed to the one which can show all lists.

Although the templates listed at S52 again appear in the subsequent list of templates at S54, it is also possible to arrange that the templates listed at S52 do not appear in the subsequent list of templates.

At S42 of FIG. 4, the user selects a template from the list. Specifically, the user selects a desired template from the list shown on the display unit 6 before the system proceeds to S43. This selection is made by a click with a mouse as an input unit 2 or a similar method.

At S43, the selected template is read and different types of data in the current document are allocated to fields with corresponding attributes. More specifically the selected template is read from the template part 13 of the ROM 11 and stored in a reserved work area of the RAM 21, and different types of printing data in the current document are allocated to fields with corresponding attributes in the selected template, before returning to S12 (FIG. 2) for previewing.

Hence, according to the flowcharts of FIGS. 4 and 5, for the media loaded in the currently selected printer 3 among the printers 3 connected with the main body 2, templates are listed on the display unit 6 in reverse chronological order of use or according to a default condition (for example, in a predetermined order, or in the order of filename, date, etc) so that the user can select a desired template from the list and a printed label image in the selected template format is automatically previewed.

Figure 9:
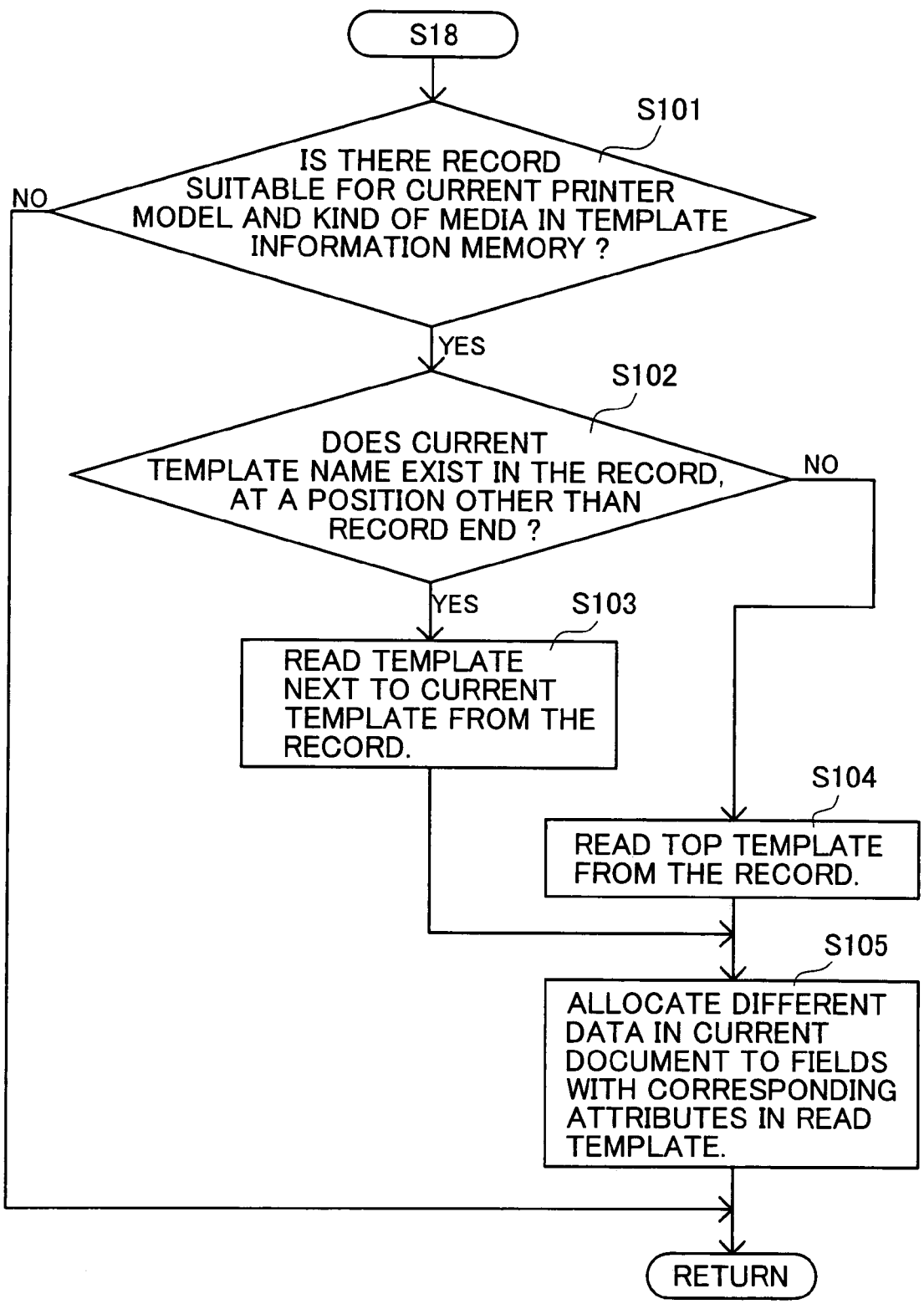
FIG. 9 is a flowchart concerning a template change process under a sub-program to be used in a display printing system according to the embodiment of the present invention.

The template change process at S18 of FIG. 2 can be explained with reference to FIG. 9 instead of FIGS. 4 and 5. FIG. 9 is also a flowchart concerning a sub-program for a template change process. As shown in FIG. 9, in this template change process, first at S101 a decision is made as to whether or not the template information memory 22 contains a record suitable for the current printer model and kind of media. More specifically, whether or not there is a record suitable for the media loaded in the currently selected printer 3 in the TEMPLATE USED column 25 of the template information 26 is decided.

When it is decided that there is no record suitable for the media loaded in the currently selected printer 3 in the TEMPLATE USED column 25 of the template information 26 (NO at S101), nothing is done and the system returns to S12 of FIG. 2 for previewing.

On the other hand, when it is decided that there is a record suitable for the media loaded in the currently selected printer 3 in the TEMPLATE USED column 25 of the template information 26 (YES at S101), the system proceeds to S102. At S102, a decision is made as to whether the current template name exists in the record concerned but not at the end of the record, namely the current template is not identified at the end of the record (rightmost position in the TEMPLATE USED column 25).

When it is decided that the current template exists in the record concerned and is not identified at the end of the record (rightmost position in the TEMPLATE USED column 25) (YES at S102), the system proceeds to S103. At S103, a template next to the currently selected one is read from the record. More specifically, in the TEMPLATE USED column 25 of the template information 26 which corresponds to the media loaded in the currently selected printer 3, a template identified on the right of the currently selected template is read from the template part 13 of the ROM 11 and stored in a reserved work area of the RAM 21.

On the other hand, when it is decided that the current template does not exist in the record concerned or is identified at the end of the record (rightmost position in the TEMPLATE USED column 25) (NO at S102), the system proceeds to S104. At S104, the top template is read from the record. More specifically, in the TEMPLATE USED column 25 of the template information 26 which corresponds to the media loaded in the currently selected printer 3, the leftmost identified template is read from the template part 13 of the ROM 11 and stored in a reserved work area of the RAM 21.

After the step of S103 or S104 is carried out, the system proceeds to S105 where different types of data in the current document are allocated to fields with corresponding attributes in the read template. More specifically, after different types of printing data in the current document are allocated to fields with corresponding attributes in the read template, the system returns to S12 (FIG. 2) for previewing.

The template change process (S18 of FIG. 2) as shown in the flowchart of FIG. 9 is carried out each time the CHANGE TEMPLATE button 104 is pressed, as indicated in FIG. 2. Hence, according to the flowchart of FIG. 9, for the media loaded in the currently selected printer 3 among the printers 3 connected with the main body 2, templates are listed in reverse chronological order of use so that by pressing the CHANGE TEMPLATE button 104, the user can select a desired template and a printed label image in the desired template format is automatically previewed.

Figure 6:
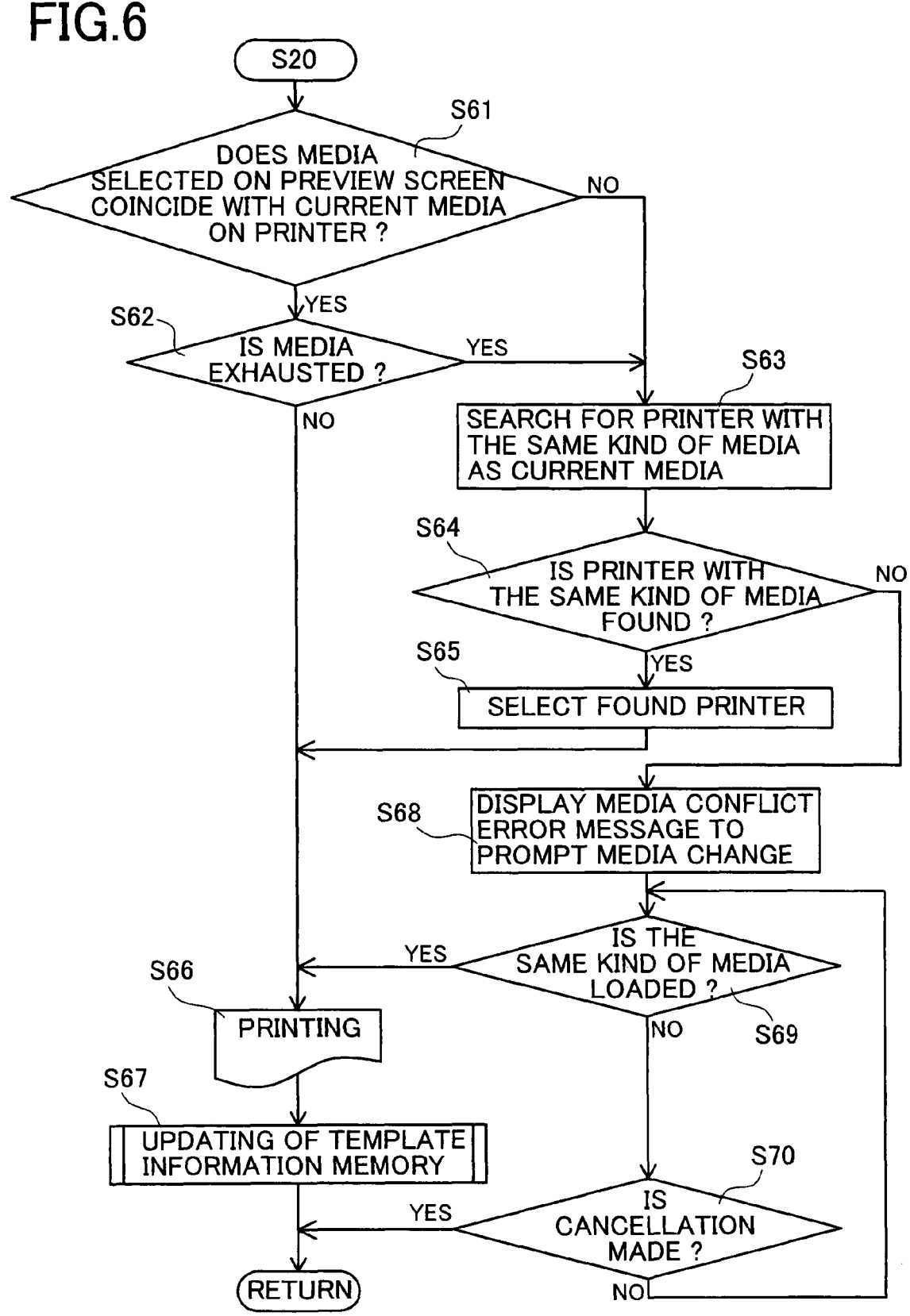
FIG. 6 is a flowchart concerning a printing process for each kind of media under a sub-program to be used in a display printing system according to the embodiment of the present invention.

Next, the printing process at S20 of FIG. 2 will be explained referring to FIG. 6. FIG. 6 is a flowchart concerning a sub-program for printing. As shown in FIG. 6, in the printing process, first at S61 a decision is made as to whether or not the kind of media selected on the preview screen coincides with the kind of media loaded in the current printer 3. More specifically, whether the kind of media currently loaded in the printer 3 is the same as the kind of media which has been relevant at S12 is decided. This decision is made based on a USB signal, etc. sent from the printer 3 to the main body 2. When it is decided that the kind of media currently loaded in the printer 3 is not the same as the kind of media selected at S12 (NO at S61), the system proceeds to S63. When it is decided that the kind of media currently loaded in the printer 3 is the same as the kind of media selected at S12 (YES at S61), the system proceeds to S62.

At S62, a decision is made as to whether or not the media is ended, or the media currently loaded in the printer 3 is exhausted. This decision is also made based on a USB signal, etc. sent from the printer 3 to the main body 2. When it is decided that the media currently loaded in the printer 3 is not exhausted (NO at S62), the system proceeds to S66 for printing. When it is decided that the media currently loaded in the printer 3 is exhausted (YES at S62), the system proceeds to S63.

At S63, the system looks for a printer 3 loaded with the same kind of media as the current media. More specifically, the system searches the printers connected with the main body 2 for a printer 3 loaded with the same kind of media as the kind of media selected at S12. This decision is also made based in a USB signal, etc. sent from the printer 3 to the main body 2. Then, at S64 a decision is made as to whether or not the system has found a printer 3 as searched for, or a printer 3 loaded with the same kind of media as the kind of media selected at S12, among the printers 3 connected with the main body 2.

When it is decided that the system has found, among the printers 3 connected with the main body 2, a printer 3 loaded with the same kind of media as the kind of media selected at S12 (YES at S64), the system proceeds to S65 where the printer 3 as searched for at S63 is selected. Then the system proceeds to S66 for printing. When it is decided that the system has not found, among the printers 3 connected with the main body 2, a printer 3 loaded with the same kind of media as the kind of media selected at S12 (NO at S64), the system proceeds to S68 where a media conflict error message is displayed to prompt media change. More specifically, a media conflict error message is issued to the printer 3 in which the media selected at S12 is exhausted, in order to urge the user to load new media. This display is made according to a USB signal, etc. sent from the printer 3 to the main body 2.

Then at S69, a decision is made as to whether or not the current media is replaced by the same kind of media, or the same kind of media is newly loaded in the printer 3 in which the media selected at S12 is exhausted. This decision is also made according to a USB signal, etc. sent from the printer 3 to the main body 2. When it is decided that the same kind of media is newly loaded in the printer 3 in which the media selected at S12 is exhausted (YES at S69), the system proceeds to S66 for printing. When it is decided that the same kind of media is not newly loaded in the printer 3 in which the media selected at S12 is exhausted (NO at S69), the system proceeds to S70.

At S70, a decision is made as to whether or not cancellation is made. This cancellation is made by pressing a given key of a keyboard as an input unit 2. When it is decided that cancellation is not made (NO at S70), the system returns to S69 where a decision is repeatedly made as to whether or not the media is newly loaded. When it is decided that cancellation is made (YES at S70), the system returns to S12 of FIG. 2 for previewing.

In the above printing process at S66, the format information of the current template and printing data are sent to the printer 3 in which the same kind of media as the media selected at S12 is loaded, among the printers 3 connected with the main body 2. With the procedure mentioned so far, the printer 3 prints an image as previewed at S12 of FIG. 2 on the media to make a label.

Figure 7:
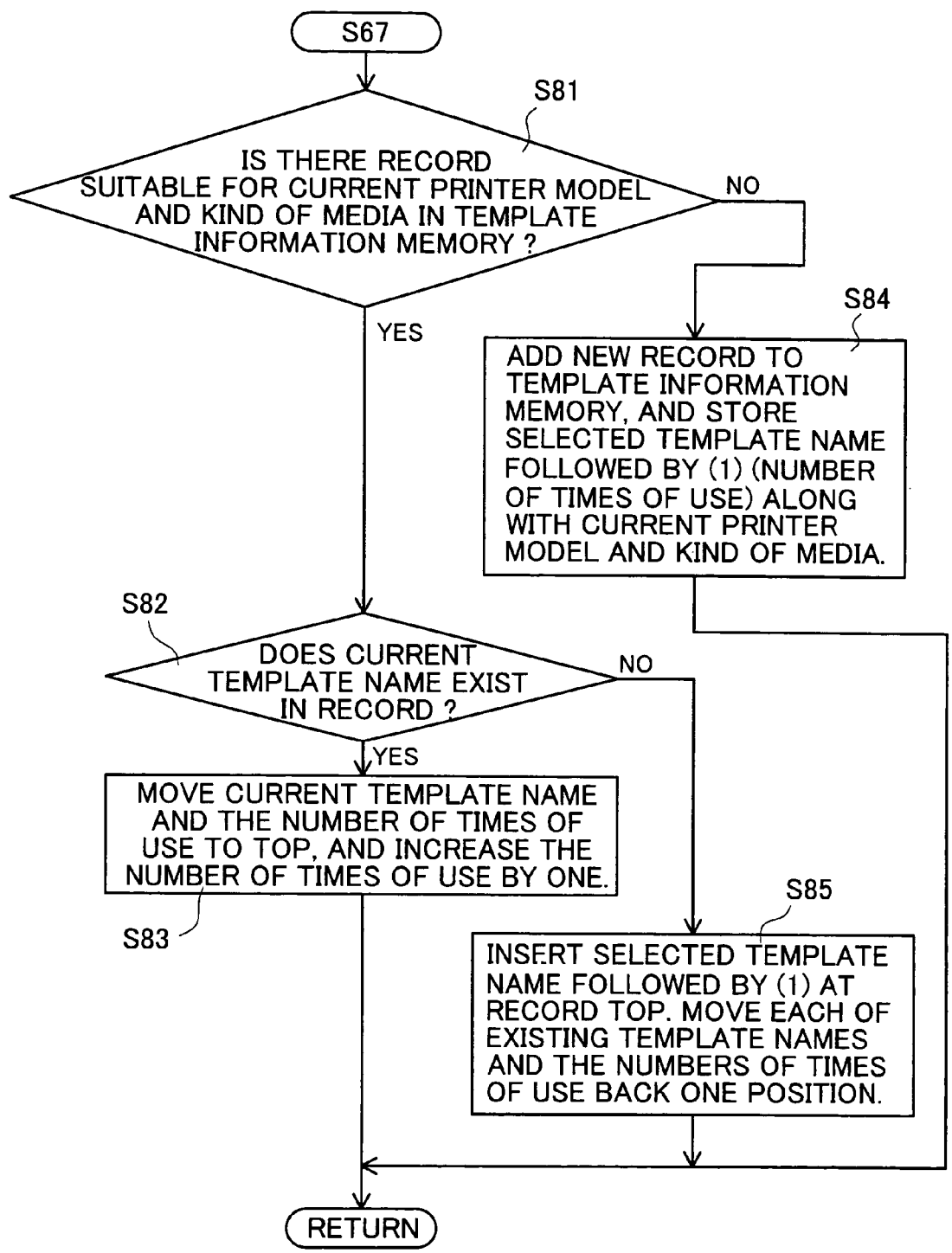
FIG. 7 is a flowchart concerning updating of a template information memory under a sub-program to be used in a display printing system according to the embodiment of the present invention.

After the printing process at S66, the system proceeds to S67 where the template information memory is updated. Then, the system returns to S12 for previewing. How the template information memory is updated is explained below referring to FIG. 7. FIG. 7 is a flowchart concerning a sub-program for updating of the template information memory. As shown in FIG. 7, in the template information memory updating process, first at S81 a decision is made as to whether or not the template information memory 22 contains a record suitable for the current printer model and kind of media. More specifically, whether or not there is a record suitable for the media loaded in the currently selected printer 3 in the TEMPLATE USED column 25 of the template information 26 is decided.

When it is decided that there is a record suitable for the media loaded in the currently selected printer 3 in the TEMPLATE USED column 25 of the template information 26 (YES at S81), the system proceeds to S82. At S82, a decision is made as to whether or not the record includes the current template name. More specifically, whether or not the template previewed at S12 is identified in the TEMPLATE USED column 25 of the template information 26 which corresponds to the media loaded in the currently selected printer 3 is decided at S82.

When it is decided that the template previewed at S12 is identified in the TEMPLATE USED column 25 of the template information 26 which corresponds to the media loaded in the currently selected printer 3 (YES at S82), the system proceeds to S83. At S83, the current template name and the number of times of use are moved to the top and the number of times of use is increased by one.

Concretely, for example, when the currently selected printer 3 is identified as "A(1)" and the kind of media loaded in the printer 3 is identified as "ADDRESS LABEL" in the template information 26 as shown in FIG. 1 and the template previewed at S12 is identified as Template 4, in the TEMPLATE USED column 26, the previously stored "TEMPLATE 4" is moved to the leftmost position (top of record) and stored while the previously stored "TEMPLATE 1 (2)" is moved to the right and stored. The number in parentheses next to the words "TEMPLATE 4" counts up by one to 6.

On the other hand, when it is decided that the template previewed at S12 is not identified in the TEMPLATE USED column 25 of the template information 26 which corresponds to the media loaded in the currently selected printer 3 (NO at S82), the system proceeds to S85. At S85, the selected template name and "(1)" (the number of times of use) are inserted at the top of record and the existing template names followed by the number of times of use are moved back or to the right by one position.

Concretely, for example, when the currently selected printer 3 is identified as "A(1)" and the kind of media loaded in the printer 3 is identified as "ADDRESS LABEL" in the template information 26 as shown in FIG. 1 and the template previewed at S12 is identified as TEMPLATE 6, in the TEMPLATE USED column 26 "TEMPLATE 6 (1)" is stored at the leftmost position (top of record) and the previously stored templates "TEMPLATE 1 (2)", "TEMPLATE 4 (5)", and "TEMPLATE 3 (1)" are moved to the right and stored.

At S81, when it is decided that there is no record suitable for the media loaded in the currently selected printer 3 in the TEMPLATE USED column 25 of the template information 26 (NO at S81), the system proceeds to S84. At S84, a new record is added to the template information memory 22 and the selected template name and "(1)" (the number of times of use) as well as the current printer model and kind of media are stored.

Concretely, for example, when the currently selected printer 3 is identified as "B(1)" and the kind of media loaded in the printer 3 is identified as "ADDRESS LABEL" in the template information 26 as shown in FIG. 1 and the template previewed at S12 is identified as TEMPLATE 1, "B(1)" is newly added in the PRINTER MODEL column 23 and "ADDRESS LABEL" is newly added in the corresponding KIND OF MEDIA column 24 and "TEMPLATE 1 (1)" is newly added in the corresponding TEMPLATE USED column 26.

After one of the steps S83, S84, and S85 is carried out, the system returns to S12 for previewing.

Therefore, according to the flowchart of FIG. 6, for the media loaded in the currently selected printer 3 among the printers 3 connected with the main body 2, when it is the same kind of media as the media selected at S12 and exhausted, the system searches for a printer 3 in which the same kind of media as selected at S12 is loaded and not exhausted, selects it and makes it perform printing. On the other hand, when the system has not found a printer 3 in which the same kind of media as selected at S12 is loaded and not exhausted, a media conflict error message is issued to the currently selected printer 3 in order to urge the user to load new media of the same kind. Once printing has been performed by the printer 3, information on the template used for printing (printer model (and individual printer), the number of times of use of each template with the kind of media concerned, history of use) is added to update the template information 26.

The program as shown in the flowcharts of FIGS. 2 to 9 is stored in the program part 12 of the ROM 11. The CPU 7 reads and executes it. Alternatively, it may be stored, for example, on a flexible disk and read through the FDD 8 and executed by the CPU 7.

As detailed so far, with the display printing system 1 and program stored on a computer readable medium according to this embodiment, a template is selected as a layout style base (S11, S15) depending on the result of detection of the model (and individual printer) of the printer 3 connected with the main body 2 and the kind of media loaded thereon. Here, this selection is made based on the template information 26 as sorted by printer model (and individual printer) and by kind of media, with priority given to the most frequently used or latest (last used) template (S33, S93). Then a printed image with printing data arranged in the selected template is previewed (S12).

In this respect, when all templates for the kind of the media loaded in the printer 3 are listed on the display unit 6 based on the template information 26 (S52, FIG. 15) by pressing the CHANGE TEMPLATE button 104, the user can select a desired template from the list of templates by a click with the mouse as an input unit 5 and a printed image with printing data arranged in the desired template is previewed (S12).

On the other hand, when templates for the kind of the media loaded in the printer 3 are selected in reverse chronological order of use (S103, S104) by pressing the CHANGE TEMPLATE button 104, a printed image with printing data arranged in the selected template is previewed (S12).

When the media loaded in the printer 3 is exhausted or changed, the system searches for another printer 3 loaded with the same kind of media (S63) or an error message is issued to the printer 3 with the media exhausted (S68) to prompt media change. Therefore, even when the media is exhausted during continuous printing by a printer 3, when another printer 3 loaded with the same kind of media is found, the printing job is automatically taken over and continued by the newly found printer 3.

When the model of the printer 3 (and individual printer) connected with the main body 2 or the kind of media loaded in the printer 3 is changed, based on the template information 26, a template as a layout style base is selected depending on the result of detection after the change (S11, S15) and a printed image with printing data arranged in the selected template is previewed (S12).

Once printing has been performed (S20), in the template information 26, information (history of use, the number of times of use) on the template used with the relevant printer model (and individual printer) and kind of media for previewing is updated (S67).

As apparent from what has been described so far, the display printing system 1 and program stored on a computer readable medium according to this embodiment perform automatic editing operation convenient for the user and improve user-friendliness.

The present invention may be embodied in other specific forms without departing from the spirit or essential characteristics thereof.

For example, the program shown in the flowcharts of FIGS. 2 to 9 may be stored on a hard disk so that it is read through a HDD and executed by the CPU 7.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. A display printing system, comprising:
a printer in which different kinds of printing media can be loaded;
an input device for loading data to be printed on the printing media;
a first memory for storing a plurality of layout styles suitable for the printing media;
a second memory for storing information on the layout styles already used as template information, the layout styles already used being listed in reverse chronological order of use for each kind of the printing media;
a preview editor for arranging the data in a layout style selected from the first memory according to the template information to make up a printed image;
a display for showing the printed image;
an output device for outputting the data together with format information shown through the printed image, to the printer; and
a detector for detecting the kind of printing media loaded in the printer;
wherein the display printing system further comprises:
a changer for enabling to change to a desired layout style for the preview editor; and
an updater for updating the template information to allocate a previously existing layout style to a different previously existing kind of printing media detected by the detector.

2. A non-transitory computer readable medium having a program stored thereon, wherein the program, when executed, enables a computer to work as the display printing system as claimed in claim 1.

3. The display printing system of claim 1, wherein the preview editor selects the layout style with priority on the highest frequency of use according to the result of detection by the detector and the template information, and the layout style is the arrangement of the data on the printing media that is independent from the formatting information.

4. A display printing system, comprising:
a printer in which different kinds of printing media can be loaded;
an input device for loading data to be printed on the printing media;
a first memory for storing a plurality of layout styles suitable for the printing media;
a second memory for storing information on the layout styles already used as template information, the layout styles already used being listed in reverse chronological order of use for each kind of the printing media;
a preview editor for arranging the data in a layout style selected from the first memory according to the template information to make up a printed image;
a display for showing the printed image;
an output device for outputting the data together with format information shown through the printed image, to the printer; and
a detector for detecting the kind of printing media loaded in the printer;
wherein:
the display printing system further comprises an opportunity provider for giving the preview editor an opportunity to change the layout based on a signal that at least one of the printer and printing media has changed;
the preview editor selects the layout style with priority on the highest frequency of use according to the result of detection by the detector and the template information, and the layout style is the arrangement of the data on the printing media that is independent from the formatting information, every time the opportunity is given.

5. A non-transitory computer readable medium having a program stored thereon, wherein the program, when executed, enables a computer to work as the display printing system as claimed in claim 4.

6. A display printing system, comprising:
a printer in which different kinds of printing media can be loaded;
an input device for loading data to be printed on the printing media;
a first memory for storing a plurality of layout styles suitable for the printing media;
a second memory for storing information on the layout styles already used as template information, the layout styles already used being listed in reverse chronological order of use for each kind of the printing media;
a preview editor for arranging the data in a layout style selected from the first memory according to the template information to make up a printed image;
a display for showing the printed image;
an output device for outputting the data together with format information shown through the printed image, to the printer; and
a detector for detecting the kind of printing media loaded in the printer;
wherein:
the display printing system further comprises:
an opportunity provider for giving the preview editor an opportunity to change the layout based on a signal that at least one of the printer and printing media has changed;
a lister for showing, on the display unit, a list of layout styles allocated to the kind of printing media loaded in the printer according to the result of detection by the detector and the template information; information, the list of layout styles being shown in chronological order of use and continuously shown in a predetermined order; and
a selector for selecting a desired layout style from the list of layout styles; and
the preview editor changes the layout style according to the result of selection by the selector and the preview editor selects the layout style with priority on the highest frequency of use according to the result of detection by the detector and the template information where the layout style is the arrangement of the data on the printing media that is independent from the formatting information.

7. A non-transitory computer readable medium having a program stored thereon, wherein the program, when executed, enables a computer to work as the display printing system as claimed in claim 6.

8. A display printing system, comprising:
- plurality of printers in which different kinds of printing media can be loaded;
- an input device for loading data to be printed on the printing media;
- a first memory for storing a plurality of layout styles suitable for the printing media;
- a second memory for storing information on the layout styles already used as template information, the layout styles already used being listed in reverse chronological order of use for each kind of the printing media and sorted by the kind of the printing media and by the individual printer;
- a detector for detecting the kind of printing media loaded in the printer;
- a preview editor for automatically selecting only one layout style according to the result of detection by the detector and the template information, the preview editor arranging the data in the layout style according to the template information to make up a printed image;
- a display for showing the printed image;
- a searcher that searches for a printer loaded with the kind of printing media for which the preview editor has selected the layout style based on a signal received from each of the plurality of printers indicating the type of printing media loaded and switches to another printer loaded with the kind of printing media for which the preview editor has selected the layout style if the printer runs out of the printing media;
- an output device for outputting the data together with format information shown through the printed image, to the printer; and
- an identifier for identifying a printer loaded with the printing media detected by the detector,
- wherein, when a different kind of printing media is loaded in the printer, the preview editor reselects a layout style and newly makes up a printed image and the display displays the printed image.

9. A non-transitory computer readable medium having a program stored thereon, wherein the program, when executed, enables a computer to work as the display printing system as claimed in claim 8.

10. The display printing system of claim 8, wherein the preview editor selects the layout style with priority on the highest frequency of use according to the result of detection by the detector and the template information, and the layout style is the arrangement of the data on the printing media that is independent from the formatting information.

11. A display printing system, comprising:
- a plurality of printers in which different kinds of printing media can be loaded;
- an input device for loading data to be printed on the printing media;
- a first memory for storing a plurality of layout styles suitable for the printing media;
- a second memory for storing information on the layout styles already used as template information, the layout styles already used being listed in reverse chronological order of use for each kind of the printing media and sorted by the kind of the printing media and by an individual printer;
- a detector for detecting the kind of printing media loaded in the printer;
- a preview editor for automatically selecting only one layout style according to the result of detection by the detector and the template information, the preview editor arranging the data in the layout style according to the template information to make up a printed image;
- a searcher that searches for a printer loaded with the kind of printing media for which the preview editor has selected the layout style based on a signal received from each of the plurality of printers indicating the type of printing media loaded and switches to another printer loaded with the kind of printing media for which the preview editor has selected the layout style if the printer runs out of the printing media;
- a display for showing the printed image; and
- an output device for outputting the data together with format information shown through the printed image, to the printer;
- wherein the display printing system further comprises warning device for giving a warning when the kind of printing media for which the preview editor has selected the layout style is different from the kind of printing media detected by the detecting means, and when a different kind of printing media is loaded in the printer, the preview editor reselects a layout style and newly makes up a printed image and the display displays the printed image.

12. A non-transitory computer readable medium having a program stored thereon, wherein the program, when executed, enables a computer to work as the display printing system as claimed in claim 11.

13. The display printing system of claim 11, wherein the preview editor selects the layout style with priority on the highest frequency of use according to the result of detection by the detector and the template information, and the layout style is the arrangement of the data on the printing media that is independent from the formatting information.

14. A display printing system, comprising:
- plurality of printers in which different kinds of printing media can be loaded;
- an input device for loading data to be printed on the printing media;
- a first memory for storing a plurality of layout styles suitable for the printing media;
- a second memory for storing information on the layout styles already used as template information, the layout styles already used being listed in reverse chronological order of use for each kind of the printing media and sorted by the kind of the printing media;
- a preview editor for arranging the data in a layout style selected from the first memory according to the template information to make up a printed image;
- a display for showing the printed image;
- an output device for outputting the data together with format information shown through the printed image, to the printer; and
- a searcher that searches for a printer loaded with the kind of printing media for which the preview editor has selected the layout style based on a signal received from each of the plurality of printers indicating the type of printing media loaded and switches to another printer loaded with the kind of printing media for which the preview editor has selected the layout style if the printer runs out of the printing media;

wherein the output device outputs the data together with format information shown through the printed image to the printer identified by the searcher.

15. A non-transitory computer readable medium having a program stored thereon, wherein the program, when executed, enables a computer to work as the display printing system as claimed in claim 14.

16. The display printing system of claim 14, wherein the preview editor selects the layout style with priority on the highest frequency of use, and the layout style is the arrangement of the data on the printing media that is independent from the formatting information.

\* \* \* \* \*